Jan. 23, 1968  J. E. WHITFIELD  3,364,789

PHASING TRANSMISSION

Filed Dec. 29, 1965 7 Sheets-Sheet 1

INVENTOR
JOSEPH E. WHITFIELD

BY
Cameron, Kerkam & Sutton
ATTORNEYS

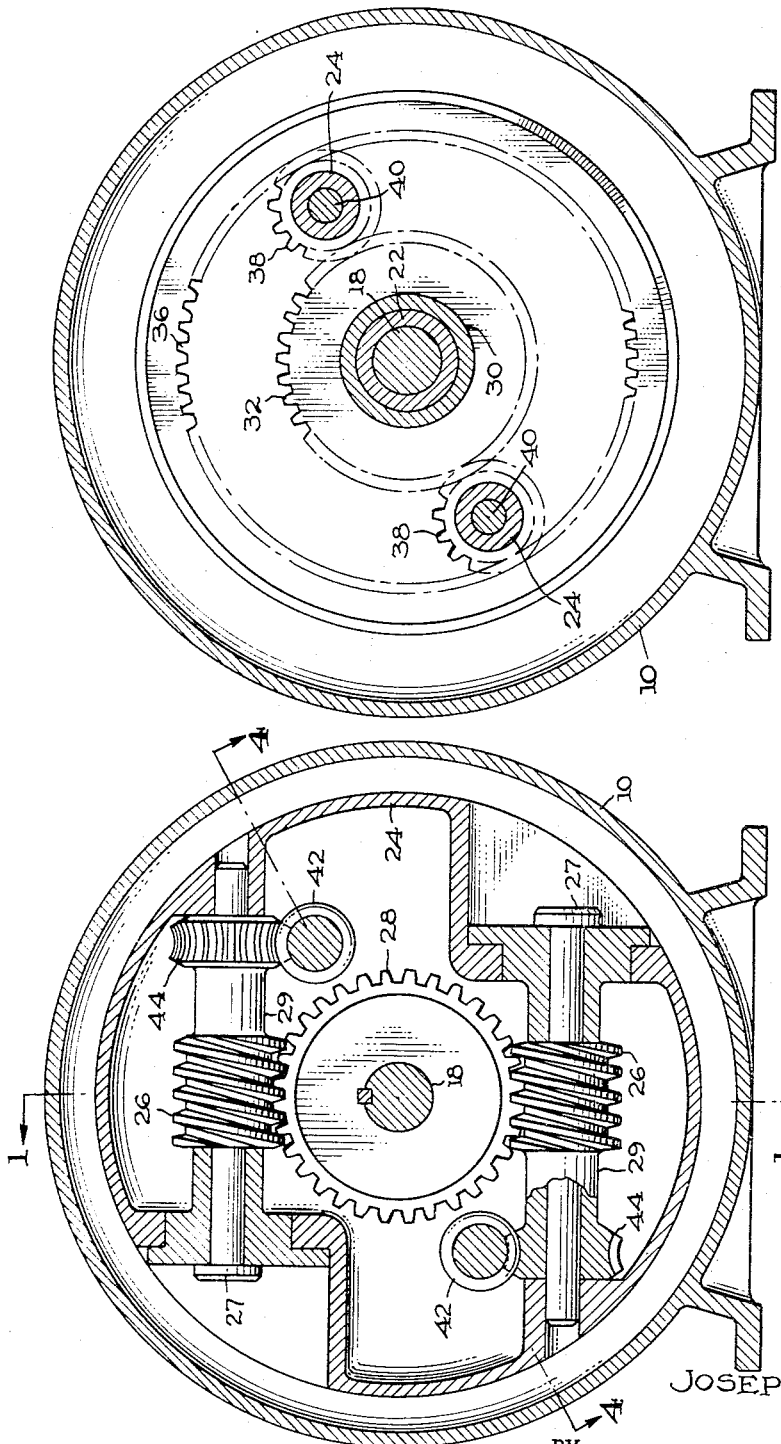

Jan. 23, 1968    J. E. WHITFIELD    3,364,789
PHASING TRANSMISSION
Filed Dec. 29, 1965    7 Sheets-Sheet 3
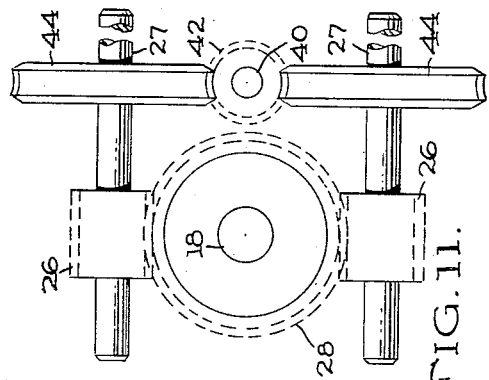
FIG. 11.
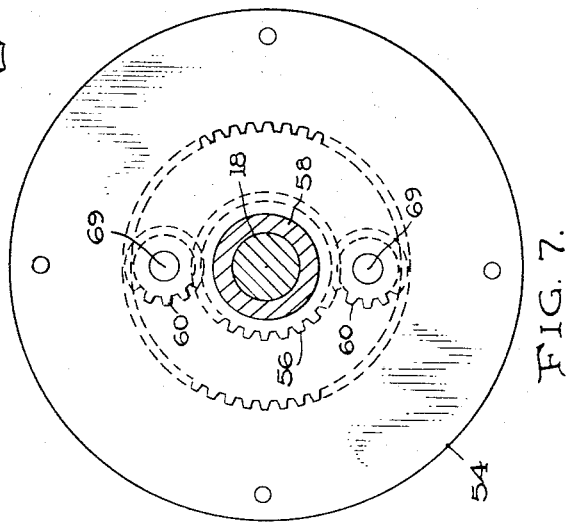
FIG. 7.
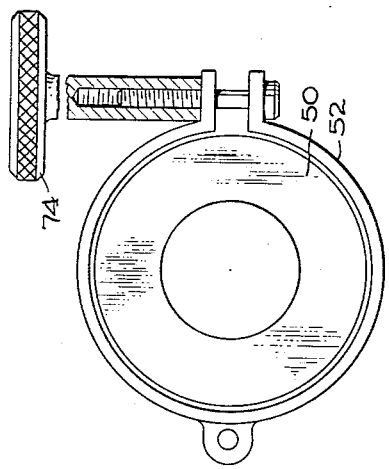
FIG. 10.
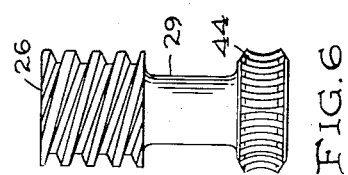
FIG. 6.
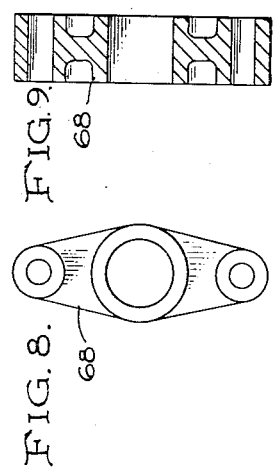
FIG. 9.
FIG. 8.
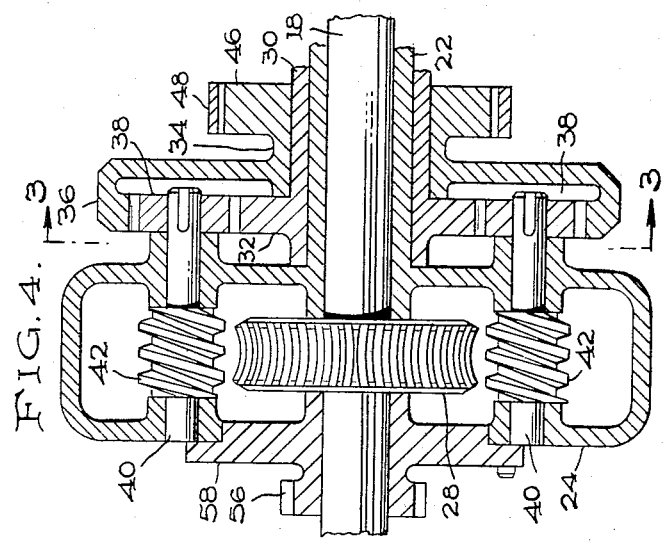
FIG. 4.
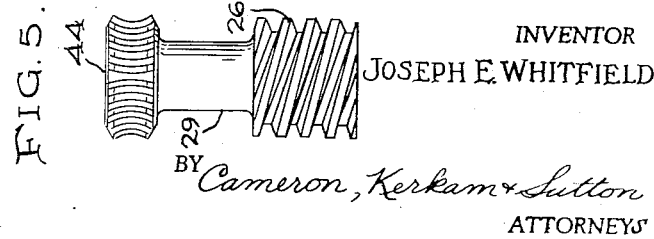
FIG. 5.
INVENTOR
JOSEPH E. WHITFIELD
BY Cameron, Kerkam & Sutton
ATTORNEYS Jan. 23, 1968  J. E. WHITFIELD  3,364,789
PHASING TRANSMISSION
Filed Dec. 29, 1965  7 Sheets-Sheet 4
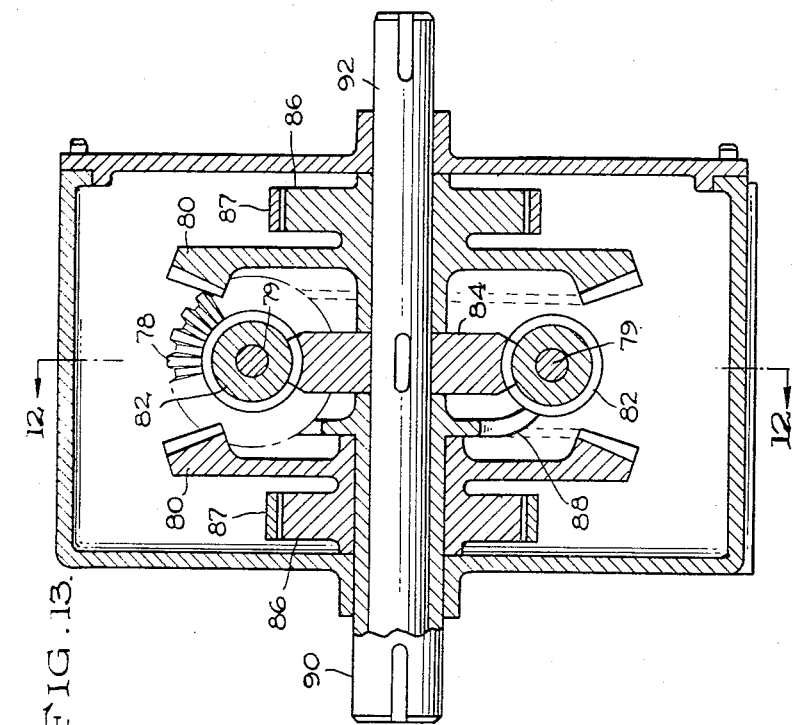
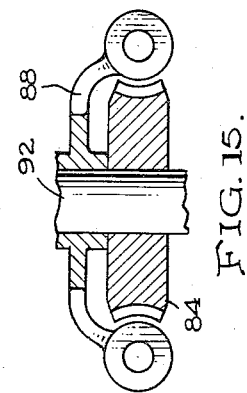
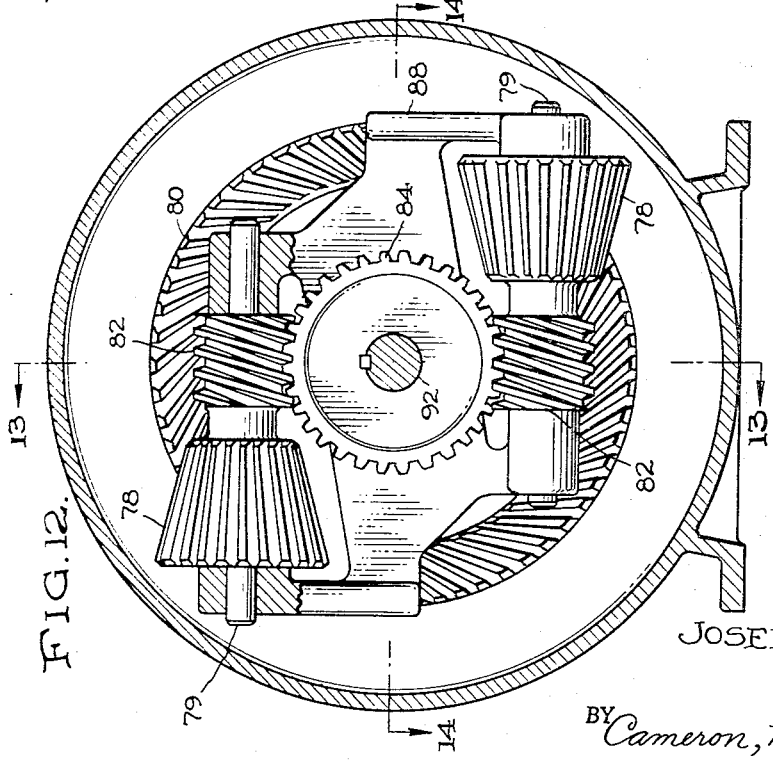
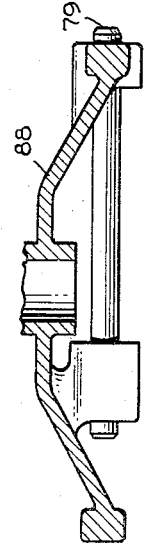
INVENTOR
JOSEPH E. WHITFIELD
BY Cameron, Kerkam & Sutton
ATTORNEYS

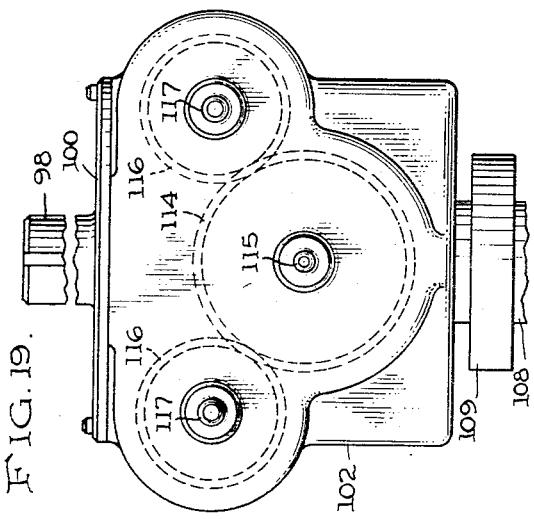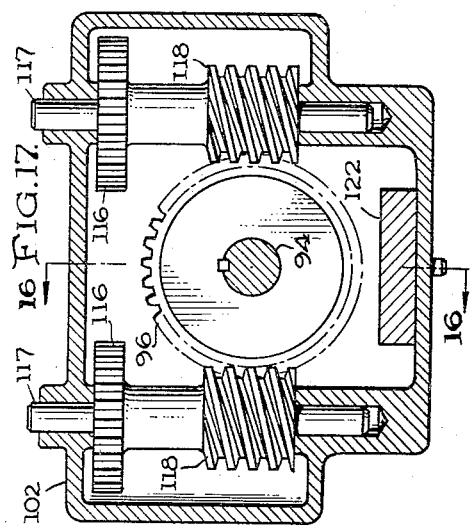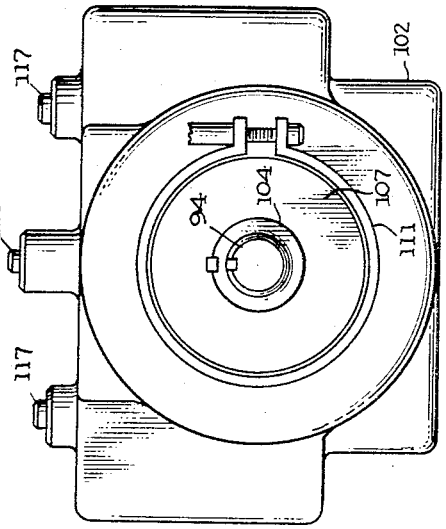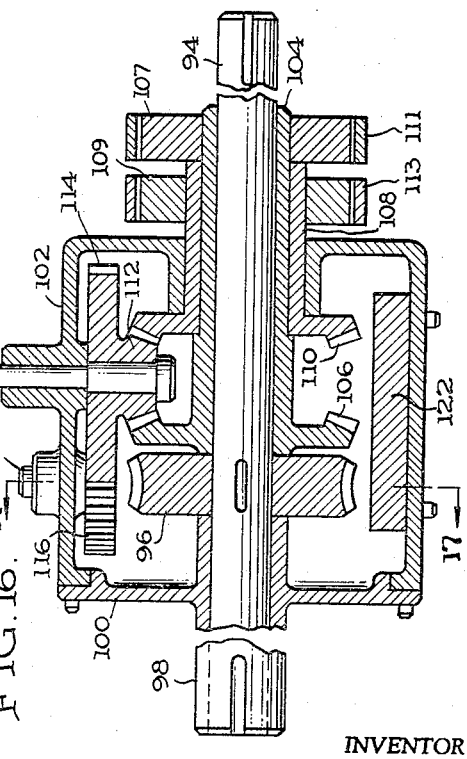

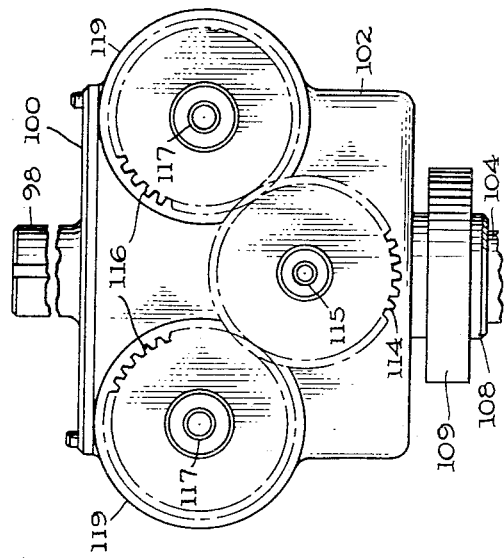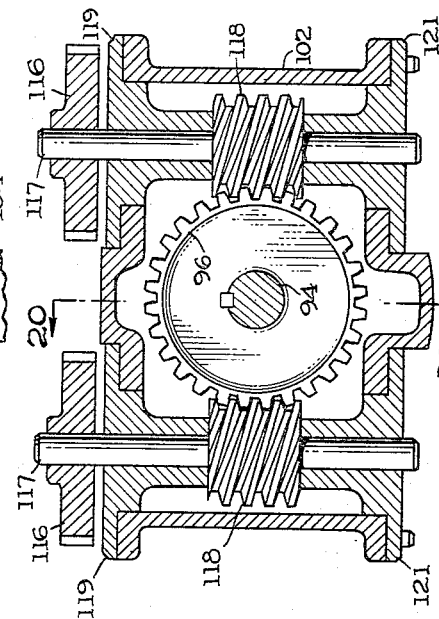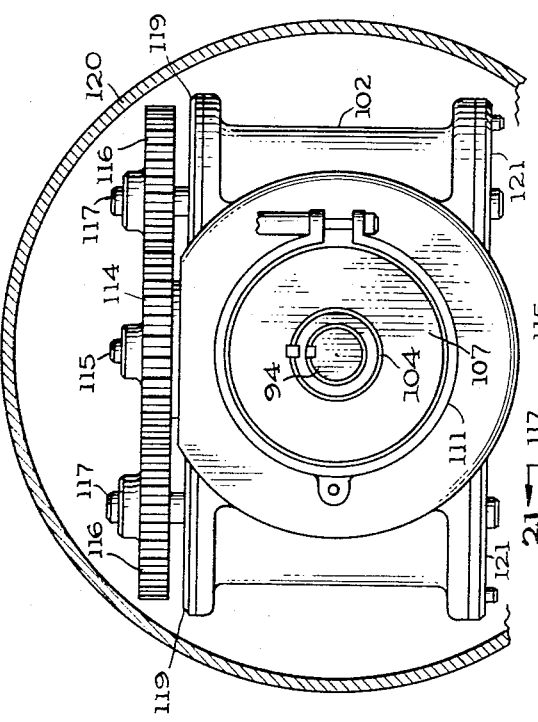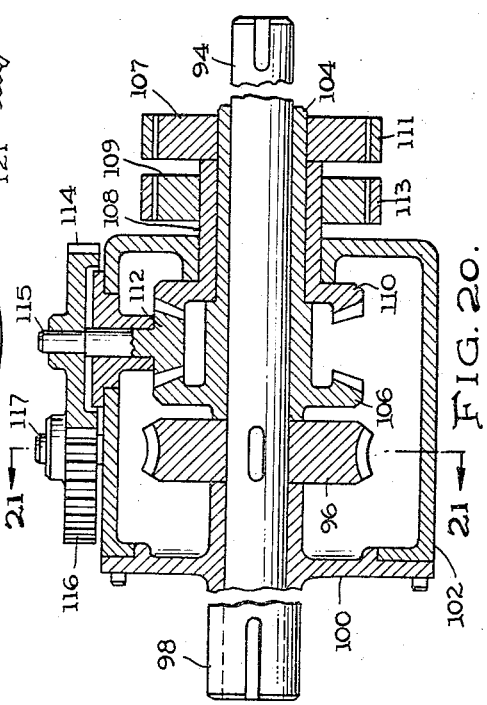

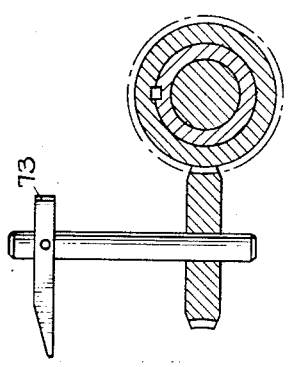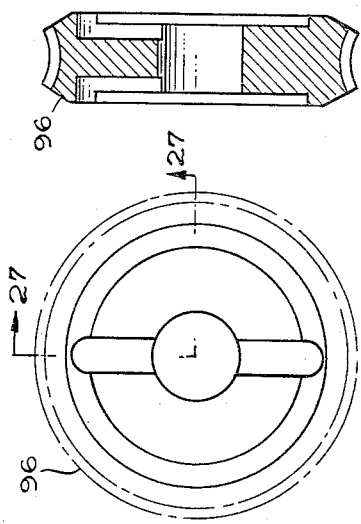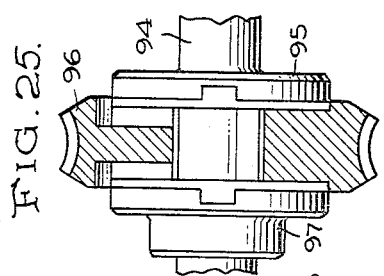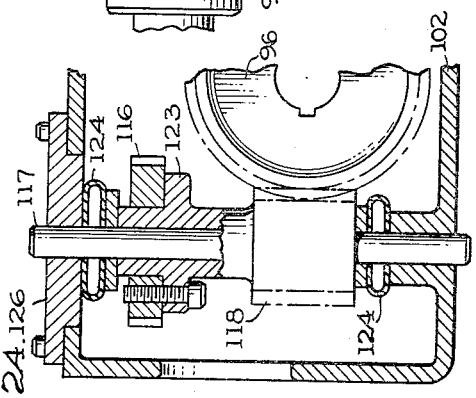

United States Patent Office 3,364,789
Patented Jan. 23, 1968

3,364,789
PHASING TRANSMISSION
Joseph E. Whitfield, P.O. Box 325, York, Pa. 17405
Filed Dec. 29, 1965, Ser. No. 517,383
18 Claims. (Cl. 74—675)

ABSTRACT OF THE DISCLOSURE

The speed of the output shaft of a mechanical power transmission, relative to its input shaft, is selectively controlled either in a constant or an intermittent manner. A straight through drive is provided by means of a pair of axially aligned shafts. The relative speed of rotation of the shaft is controlled through a gear arrangement, which is rotatably mounted on one shaft and fixedly supported to the other.

---

The present invention relates generally to phasing transmissions adapted to be interposed for power transmission between a driving means and a driven means, and more particularly to phasing transmissions having a straight through drive arranged for the correction of register or adjustment of phase between its input shaft and its output shaft.

Although it is known to provide a phasing transmission for adjusting the phase between an input shaft and an output shaft, such arrangements generally provide a differential cage mounted between the input and the output shafts to control phasing between the shafts and suffer from many serious disadvantages. For example, in such arrangements, all the power must go through the gears at all times which severely limits the speed of operation and subjects the gears to constant wear. In addition, such arrangements require the use of heavy gears which result in an unnecessary expense and are also very inefficient in that each gear contact results in a power loss of 4 to 5%. Thus, such arrangements will lose 8 to 10% of the power input.

In accordance with the present invention, these disadvantages are overcome and there is provided a phasing transmission which is extremely reliable and efficient in operation.

To this end, it is a primary object of the present invention to provide an improved phasing transmission for varying the speed of the output shaft relative to its input shaft.

Another object of the present invention is to provide an improved phasing transmission having a positive straight through drive for power transmission in either direction without power loss through gearing.

Another object of the present invention is to provide an improved phasing transmission which avoids power transmission through gears having relative motion with each other when no relative change in speed of the input and output shafts of the transmission is taking place.

A further object of the present invention is to provide an improved phasing transmission wherein an output shaft may be driven at the same speed and in the same direction as the input shaft when no phasing is desired.

Still another object of the present invention is to provide an improved phasing transmission which minimizes gear wear and gear noise.

Another object of the present invention is to provide an improved phasing transmission having a double self-locking feature when no change in speed is desired.

A further object of the present invention is to provide an improved phasing transmission in which the input and output shafts are mechanically locked together when no relative change in speed between the input and output shafts is required.

Another object of the present invention is to provide an improved phasing transmission wherein only a small amount of the input power is transmitted through the speed changing gears during phasing.

A further object of the present invention is to provide an improved phasing transmission wherein the speed change mechanism may be "inched" or "jogged."

Still another object of the present invention is to provide an improved phasing transmission wherein the percentage of overspeed and underspeed may be selectively varied.

Another object of the present invention is to provide an improved phasing transmission in which the change of relative speed ratio of the input and output shafts may be selectively varied.

Another object of the present invention is to provide an improved phasing transmission which may be used as a multiple speed transmission for continuous speed changes.

Still another object of the present invention is to provide an improved phasing transmission which avoids the use of an external source of power to effect a change in the relative speed of the output shaft to the input shaft.

Another object of the present invention is to provide an improved speed changing transmission having a built in speed change recording device for indicating a relative change in speed between the output shaft and the input shaft.

Another object of the present invention is to provide an improved speed changing transmission having a solid one piece through shaft for supporting the gear mechanism and for providing for over-hang loads.

With these and other objects in view, my invention consists in the construction, arrangement and combination of the various parts of my phasing transmission and its various gearing arrangements to accomplish the objects contemplated as hereinafter more fully set forth, pointed out in the appended claims and illustrated in the accompanying drawings. To this end, the present invention provides a novel phasing transmission for increasing or decreasing the speed of an output shaft, relative to an input shaft, which may be selectively controlled at all times, constantly or intermittently, while the transmission is in operation or at rest.

In one embodiment of the present invention, there is provided a mechanical power transmission having a straight through driving arrangement adapted to be interposed between a driving means and a driven means. The straight through drive comprises a pair of axially aligned shafts, either of which may serve as the input or the output shaft. A gear arrangement is rotatably mounted on one shaft and fixedly supported to the other shaft for controlling the relative speed of rotation of the shafts in response to actuation of a control braking means operably connected to the gear arrangement, while a self-locking gear included in the gear arrangement mechanically locks the shafts when no relative change in speed of the shafts is required. If desired, an indicator or register operably connected to the phasing transmission may be provided to provide for indicating a relative change in speed of the shafts.

While the specification concludes with claims particularly pointing out and distinctly claiming the subject matter of the invention, it is believed the invention will be more easily understood from the following detailed description thereof taken in connection with the accompanying drawings; however, it is to be expressly understood that these drawings are for the purpose of illustration only and are not intended to represent the full scope of the invention which is defined by the appended claims.

In the drawings:

FIG. 2 is a cross sectional view taken on line 2—2 of FIG. 1 and shows the driving worm gears in mesh with the worm wheel.

FIG. 3 is a cross sectional view taken on line 3—3 of FIG. 4 and shows the planetary gears in mesh with the sun gear and the internal gear.

FIG. 4 is a partial longitudinal section taken on line 4—4 of FIG. 2 with the driving worm gear removed and the driven worm gears and worm wheel shown in full for clarity and, when taken together with FIGS. 5 and 6, shows the complete speed change gearing.

Figure 1:
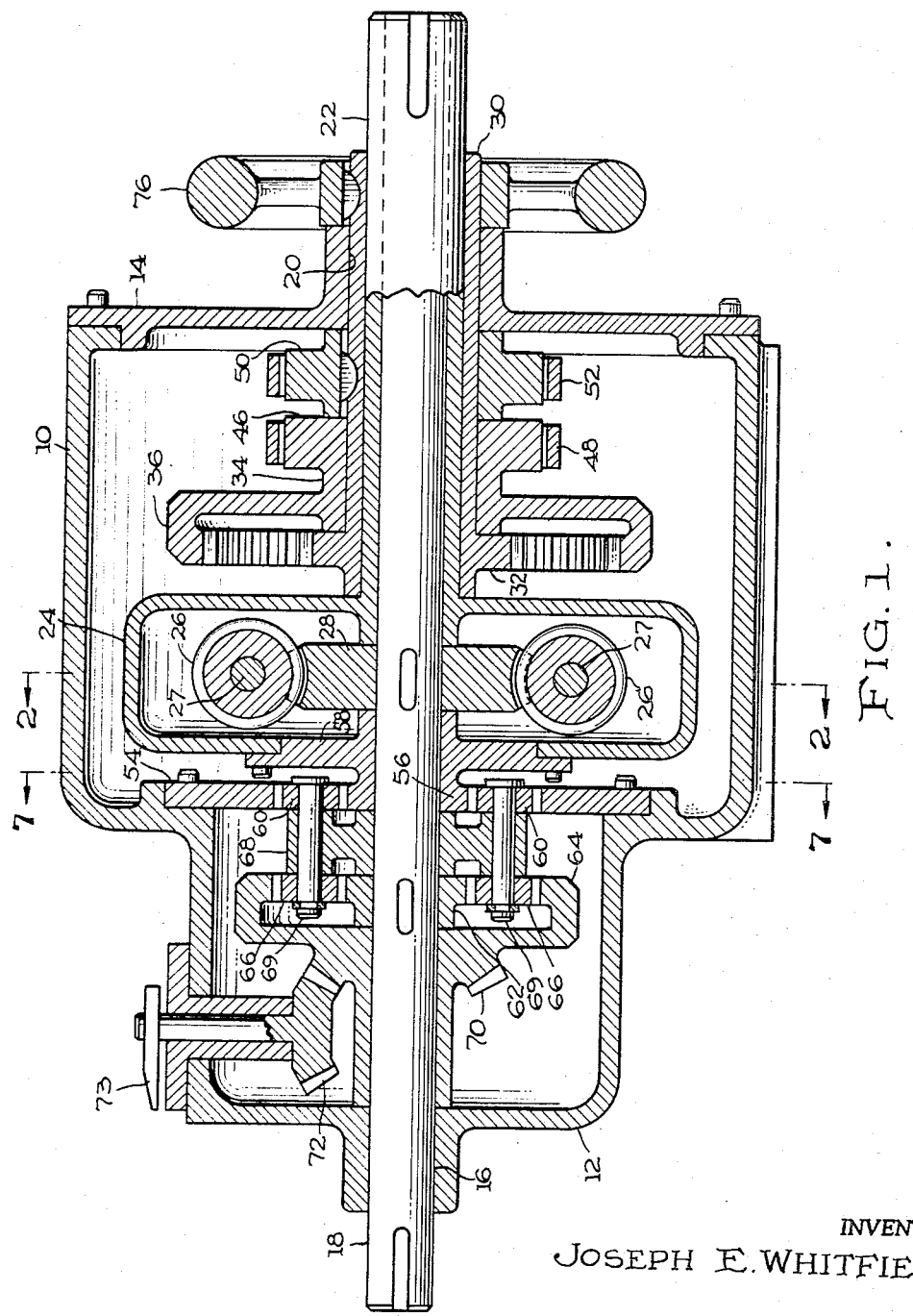
FIG. 1 is a longitudinal sectional view taken on line 1—1 of FIG. 2 and shows the rotating parts mounted on a common shaft.

FIGS. 5 and 6 show a pair of similar inter-connecting gear units, each unit consisting of a worm gear and a worm wheel, the worm gear and worm wheel being integral in this instance, and these two units, FIGS. 5 and 6, complete the speed change gearing of the arrangement shown in FIGS. 1, 2 and 4.

FIG. 7 is a cross sectional view through FIG. 1 taken on line 7—7 and showing one set of the speed change recording gears.

FIGS. 8 and 9 show details of the spider only that carries the planetary gears in the speed change recording mechanism.

FIG. 10 shows a typical brake drum together with a brake band and a means for applying the brake.

FIG. 11 is a diagrammatic layout of the speed changing gears in which only one pinion is used instead of two as in FIGS. 2, 3 and 4.

FIGS. 12 through 15 are views of an optional embodiment in which hypoid gears (which are actually bevel gears set with offset pinions) are used to effect the speed change wherein FIG. 12 is a cross sectional view taken on line 12—12 of FIG. 13, FIG. 13 is a longitudinal sectional view taken on line 13—13 of FIG. 12, FIG. 14 is a partial sectional view taken on line 14—14 of FIG. 12 and shows only a sectional view of the pinion spider and also shows a pinion shaft as assembled in the spider, and FIG. 15 is a partial sectional view also taken on line 13—13 of FIG. 12 and shows only a sectional view of the pinion spider together with its relation to the worm wheel.

FIGS. 16 through 19 show still another optional embodiment wherein bevel gears are used to effect the speed change with the pinions and gear that drive the worm gears being inside the gear cage.

FIG. 16 is a longitudinal section through the unit taken on line 16—16 of FIG. 17.

FIG. 17 is a cross sectional view through the unit taken on line 17—17 of FIG. 16.

FIG. 18 is an outside end view of FIG. 16 looking against the input end and showing a brake drum together with its brake band.

FIG. 19 is a top view showing the outside of the gear cage with the layout arrangement of the gear and meshing pinions, the gear and pinions being inside the gear cage and indicated by dotted lines for clarity.

For simplicity, no housing is shown in FIGS. 16 through 19, but it could be similar to that shown in FIGS. 1, 2 and 3.

FIGS. 20 through 23 show another embodiment, similar to that shown in FIGS. 16 through 19 except the pinions and mating gear are outside the gear cage, wherein FIG. 20 is a longitudinal section through the unit taken on line 20—20 of FIG. 21, FIG. 21 is a cross sectional view taken through the unit on line 21—21 of FIG. 20, FIG. 22 is an outside end view looking against the drive end, a partial housing being indicated and FIG. 23 is an outside top view showing the pinions and mating gear as being outside the gear cage instead of inside as in FIG. 19.

FIG. 24 shows a section through a part of the unit as shown in FIG. 17 and shows spring washers on the pinion shaft to balance the load on the teeth of the worm wheel. These spring washers would be used on both pinion shafts. Also shown in FIG. 24 is a method of adjusting the gears at assembly for proper meshing of the gears.

This adjustment would be applied to only one of the two pinion shafts.

FIG. 25 is an assembly view of the main worm wheel being mounted so that it may "float" slightly to provide even loading for the gear teeth, the worm wheel being shown in section.

FIG. 26 is a side view of the worm wheel only as shown in FIG. 25 and shows the driving slots.

FIG. 27 is a section through the worm wheel only taken on line 27—27 of FIG. 26 and also more clearly shows the driving slots.

FIG. 28 shows how the speed change recorder may be driven by worm gearing instead of bevel gearing as shown in FIG. 1.

In the specification and claims certain terms are used and to make the meaning thereof clear the following definitions are set forth.

"Worm gears" are sometimes called "worms" and have the teeth running around the periphery of the gear, similar to the threads on a bolt and are designated throughout the specification as "worm gears." The "worm wheel" may be also called a "worm gear," but to distinguish between the two gears that make up a worm gear set, the wheel that mates with the worm gear is designated through the specification as "worm wheel" and has its teeth running across the face of the gear at a slight angle to the axis of the gear, and in all these instances is much larger in diameter than the "worm gear."

Referring now to FIG. 1 the housing 10 may be round as shown in FIGS. 2 and 3 and has one end wall 12 integral with the housing and another end wall 14 being made separately and fastened thereto as by bolts. The end wall 12 has a bearing 16 centrally located to receive the solid shaft 18. Likewise, the separate end wall 14 has a centrally located bearing 20 to support the hollow shaft 22, the shaft 22 being fitted over and operating on the shaft 18 similar to a hollow sleeve.

It should be made clear in the beginning that all of the various embodiments shown will operate in either direction and that either the hollow shaft or the solid shaft may be the input or output shaft with substantially equal results but, for the sake of simplicity, hereinafter the solid shaft will be termed the input shaft and the hollow shaft will be termed the output shaft. Advantageously, in the preferred embodiment, the input shaft 18 is a long solid through shaft and the output shaft is a shorter hollow shaft operating on the solid shaft. However, it should be apparent that the main worm wheel 28 could be located in the position as shown, but fixed to the extreme end of a shorter solid shaft and the other shaft would also be solid with the gear cage or pinion spider fixed to one end, the shafts being in axial alignment and the ends adjacent. In such an arrangement, another journal bearing (not shown) may be necessary to support the two shafts.

The output shaft 22 is fixedly attached to or integral with a gear cage 24 which carries worm gears 26, the worm gears 26 being in mesh with a worm wheel 28 fixedly attached to input shaft 18. Surrounding the output shaft 22 and operating thereon is another hollow shaft or sleeve 30 which has an external toothed sun gear 32 integral therewith or fixedly attached thereto. Surrounding the hollow shaft 30 is another hollow member or sleeve 34 to which is attached or is integral with the internal toothed gear 36. As shown in FIGS. 3 and 4, between the sun gear 32 and the internal gear 36 there are two pinions 38 which are in mesh with both the sun gear 32 and the internal gear 36 at all times in a planetary manner. The pinions 38 are fixedly attached to a small shaft 40. Also fixedly attached to or integral with the shaft 40 is a worm gear 42.

Referring to FIGS. 2, 5 and 6 the worm gears 26 are fixedly attached to or integral with the worm wheels 44, as by the hollow member 29, and are supported on the small shafts 27. Referring to FIGS. 4 and 5 one can imagine the two gears 26 and 44 as being lifted and placed on top of the gears 28 and 42. Likewise, the two gears 26 and 44 shown in FIG. 6 would also be placed in mesh with the gears 28 and 42 but on the under side. This would provide a complete gear assembly as shown in FIG. 2.

Attached to the hollow member 34 is a brake drum 46, the brake drum being controlled by the brake band 48. Likewise, on the hollow shaft 30 is a similar brake drum 50 which is controlled by the brake band 52. In operation, when the input shaft 18 is rotating, the worm wheel 28 will revolve and the gear cage 24 also will be forced to revolve because the worm gears 26 which are supported therein are meshed with the worm wheel 28. The helix angle of the worm gears 26 is such that while they can rotate the worm wheel 28, the worm wheel 28 cannot rotate the worm gears 26 and thus the unit is automatically self-locking when no change in speed is desired. With this construction the entire unit will revolve with no relative motion between the aforementioned gears. The input shaft 18 and the output shaft 22 will be locked and will turn in the same direction and at the same speed.

If the output shaft 22 is to be operated slightly faster or slower than the input shaft 18, then one of the two brake drums 46 or 50 must be held stationary by the brake bands provided. If the drum 50 is held against rotation by the band 52 then the sun gear 32 will also be held stationary. Since the cage 24 must revolve with the input shaft 18 then the pinions 38, FIGS. 3 and 4, will be carried around with the cage, but will also turn on their own axes because the gear 32 is stationary. This will turn the pinion shafts 40 and the worm gears 42. Worm gears 42 will turn the worm wheels 44 which will turn the worm gears 26. The worm gears 26 are in mesh with the main worm wheel 28 and thus, when the worm gears 26 revolve, the worm wheel 28 and its shaft 18 will be operating at a slightly different speed which may be slightly faster or slower than the cage 24 and the output shaft 22. If the internal gear 36 is held stationary by the drum 46 and brake band 48 then the pinions 38 will again revolve as the cage 24 revolves, but the pinions will now revolve in the opposite direction. Thus the gears 32 and 36 provide for an increase or decrease in speed of the output shaft, depending upon which drum is held stationary. The helix angle (right or left hand) of the worm gears also determines if the speed is increased or decreased. If either brake drum 46 or 50 is continuously held against rotation then the speed of the output shaft will continuously be slightly different from the input shaft. Since the gear 36 is larger in diameter than the gear 32 then the amount of speed increase or decrease by the output shaft in comparison with the input shaft will be dissimilar. By minor modifications to the gearing as shown in FIGS. 1, 2, 3 and 4 the percentage of speed increase could be made equal to the percentage of speed decrease if that was desirable or necessary.

In some instances it is necessary that the amount of speed increase or speed decrease be registered or controlled in some manner. This is accomplished by the mechanism to the left of line 7—7 as viewed in FIG. 1. As shown, the internal gear 54 is fixedly attached to the housing as by bolts, and an inner sun gear 56 is fixedly attached to the gear cage 24 by the flange 58. The pinions 60 mesh with both the gears 54 and 56 at all times. The sun gear 56 is free on the shaft 18, while the outer sun gear 62 is fixedly attached to the shaft 18, as by a key. The internal gear 64 is free to turn on the shaft 18 and the pinions 66 are constantly in mesh with both gears 62 and 64. Gear 62 is the same size as gear 56. Gear 64 is the same size as gear 54 and the pinions 66 are the same size as the pinions 60. The pinions 66 and 60 are free to turn independently on the shaft 69.

When the unit is in operation, gear 56 will be revolving and gear 54 is stationary. Thus the pinions 60 will be carried around the axis of the shaft 18 by the spider 68, the spider 68 being free to turn on the shaft 18, and the pinions 60 will also revolve on their own axes which are the pinion shafts 69. If no speed change is taking place the sun gears 56 and 62 will be revolving at the same speed. Thus, also, since the gear 54 is always stationary then the gear 64 will also remain stationary. Since the bevel gear 70 is attached to the gear 64 it will likewise be stationary. When gear 70 is stationary, then the bevel pinion 72, which meshes with gear 70, will also be stationary. In this event the indicator 73 will likewise the stationary. Thus, even though the unit is in operation and part of the gears are revolving, the recorder 73 is stationary. However, if one of the brake drums, 46 or 50, is held against rotation then there will be a difference in speed between the gears 56 and 62 and this difference in speed will be reflected in a slow rotation of gears 64, 70 and 72. The direction of rotation of the recorder will be determined by the helix angle (right or left hand) of the worm gears and which brake drum is being held stationary.

The entire rotating mechanism is carried on the through shaft 18 and in the bearings 16 and 20 of the housing 10 and housing end wall 14. The brake bands 48 and 52 may be tightened by the hand wheel 74 or by any suitable method. In the event it is necessary to adjust the output shaft when the unit is stationary this can be accomplished, in either direction, by use of the single hand wheel 76.

FIG. 11 is a diagrammatic view of another embodiment of the invention having a slightly different gear layout from that shown in FIGS. 1, 2, 3 and 4. In FIG. 11 only one worm gear 42 and one pinion 38 are used. This eliminates one of the shafts 40 and its two gears 38 and 42, and the two worm wheels 44 are larger in diameter. Both gear layouts, FIGS. 4 and 11, work in a similar manner. In FIG. 11, the pinion 38 is not shown, but is located directly behind and hidden by the worm gear 42 and is fixedly attached to the same shaft 40 on which the worm gear 42 is mounted.

Referring again to the recording mechanism shown in FIG. 1 the bevel gears 70 and 72, as shown, may drive the recording arm 73 too fast or rotate it too often for easy reading and recording. Slower speed gearing could be substituted for the gears 70 and 72 as, for example, in FIG. 30 worm gears are used. Also, compound gearing of any required ratio could be used depending upon the purpose for which the unit may be intended.

In FIGS. 12 through 15 similar results are produced with a different type of gearing. In this optional embodiment there are two hypoid, or offset pinions 78, mounted between two hypoid gears 80. The pinions 78 are connected with the worm gears 82 and are mounted on the shafts 79 and worm gears 82 mesh with and operate the main worm wheel 84. Brake drums 86 are attached to the gears 80. These brake drums 86 are controlled by the brake bands 87. The pinions 78 and worm gears 82 are carried by the gear spider 88, and the spider 88 is attached to the hollow output shaft 90. The input shaft 92 is full length and carries all the gears together with the output shaft 90. The worm wheel 84 is attached to the input shaft 92 and, in operation, when the input shaft is rotated the entire gear mechanism is also rotated because the angle of the threads on the worm gears 82 provides for self locking. However, if one of the brake drums 86 is held against rotation then the pinions 78 will revolve against the face of the gears 80, one of which will be stationary, which will rotate the worm gears 82 and the worm wheel 84. Since the solid shaft 92 is being considered as the input shaft and may be running at constant speed, then any rotation of the gears 78 and 82 will increase or decrease, depending on the helix angle (right or left hand) of the gears 82, the speed of the gear spider 88 and the output shaft 90. Compared with FIG. 1, the embodiment shown in FIG. 12 has one set of self-locking gears instead of two, and thus will advantageously provide a much faster change in speed which may be desirable in some applications.

FIGS. 16 through 23 show another embodiment wherein the speed change is produced by the use of a pair of common bevel gears and one pinion. Like the other embodiments there is a straight through input shaft 94 on which is mounted a worm wheel 96. The hollow output shaft 98 is mounted on the input shaft and the output shaft has a flange 100 mounted thereon which forms one end of the gear cage 102. On the drive end of the input shaft a sleeve 104 is mounted and the bevel gear 106 is mounted on this sleeve. Another sleeve 108 is mounted on the sleeve 104 and a bevel gear 110 is attached to this sleeve 108. Bevel gears 106 and 110 are similar and a pinion 112 is mounted therebetween and operates with both bevel gears 106 and 110. The brake drum 107 together with its band 111 controls the gear 106 and the brake drum 109 together with its band 113 controls the gear 110.

The bevel pinion 12 is fixedly connected to the gear 114 and these two gears operate on the shaft 115, as shown in FIGS. 16 and 20. In FIGS. 16 and 17 the pinion 116 and the worm gear 118 are fixedly attached together and operate on the shaft 117 which is mounted directly in the gear cage 102. In this embodiment the pinions 116 and the gear 114 are all mounted inside the gear cage 102. FIGS. 20 and 21 show a slightly different arrangement of the gear 114 and the pinions 116. In this embodiment the gear 114 and pinions 116 are mounted outside the gear cage 102. The pinions 116 and the worm gears 118 are fixedly attached to the shafts 117, the shafts 117 being supported in the bearing carriers 119 and 121, the bearing carriers fitting into aligned openings in the gear cage 102.

Thus if the unit is in operation and neither brake drum is held against rotation then the entire unit operates without any relative motion between the various gears. The drive would be straight through with the output shaft turning the same speed and in the same direction as the input shaft. However, if one of the brake drums 107 or 109 is held stationary then the pinion 112 will turn on its axis which will turn the gear 114 and pinions 116 which will turn the worm gears 118 causing the worm wheel 96 to change speed. In this instance again the solid shaft 94 is designated as the input shaft which is assumed to have a fixed speed and thus does not change speed so the change of speed occurs to the hollow output shaft 98.

To make the gearing in FIGS. 16 and 17 clearly understandable, the gear 114 and pinions 116 are indicated in FIG. 19 by the dotted lines. The embodiment shown in FIGS. 20 through 23 is similar to the embodiment shown in FIGS. 16 through 19 except in FIGS. 20 through 23 the gear 114 and pinions 116 are shown as being mounted outside the gear cage 102 instead of inside the gear cage as shown in FIGS. 16 and 17. There are some advantages to both designs. For reasons of simplicity no housing is shown in FIGS. 16 through 23 except a partial housing 120 is shown in FIG. 22 to clarify the rotation of the gear cage in relation to the housing. A counterweight 122, shown in FIG. 17, may be added to balance the weight of the gears.

FIG. 24 shows one of the worm gears 118 in mesh with its worm wheel 96. Spring washers 124 are added between the gears 118 and the housing and also between the pinion 116 and the bearing plate 126. These would be added to both of the gear shafts 117, shown in FIG. 17. These spring washers will provide a very small amount of end movement of the worm gears 118 to provide for even loading on the gear teeth of the worm wheel 96. In FIG. 24 the pinion 116 is shown as being adjustably mounted with respect to the worm gear 118 so that proper adjustment may be made at assembly. Only one of the pinions 116 need be made adjustable. The bolt holes in the flange 123 are slightly oversize to provide for the adjustment.

FIG. 25 illustrates another method of balancing the load on the gear teeth of the worm wheel 96. The worm wheel is loosely fitted with clearance onto the drive shaft 94 and drives the shaft through a pair of suitable couplings, the Oldham type being shown. FIGS. 26 and 27 shows details of the worm wheel 96 when such a coupling is applied. In FIG. 25 the flange 95 to the right as viewed in the drawing may be integral with the shaft while the left flange 97 is demountable to allow assembly.

FIG. 28 shows the speed recorder of FIG. 1 as being driven by worm gearing instead of bevel gears. This would reduce the speed of the recording arm 73 where necessary. Of course compound gearing could also be used to further reduce the speed and travel of the recording arm depending upon the purpose for which such a transmission is used.

This transmission is intended as a unit wherein the output speed will normally be the same as the input speed (most of the time). Usually, for a purpose of this kind, the amount and frequency of speed change is small. It may be desired to increase or decrease the speed of the output shaft for short periods. Thus the intermediate speed is made through the direct drive without gear losses or noise. However, other requirements can be met by providing a few modifications in the gearing. For example, in FIGS. 1, 2, 3 and 4, the direct through speed could be the highest speed and there could advantageously be provided two or more lower speeds by eliminating the internal gear 36 and providing two or more gears 32 of different size and two or more pinions 38 of suitable size to give the required speed. In this last mentioned embodiment, if the helix angle of one of the sets of worm gears were reversed then the direct drive would be the lowest speed and the gears would provide two higher speeds. The direct drive should always be provided for the speed which is to be used the greatest amount of time.

If the helix angle of the worm gears was increased enough then the unit would not be self locking. For example, in an automobile transmission for cars the engine must drive the wheels but the wheels must also drive the engine in all of the gear speeds. If the gears are not self locking then a mechanical lock would be necessary. It is apparent that it is not practical to show all possible gear layouts, but the three major illustrated embodiments, together with variations of these embodiments as described, are the preferred methods to produce the desired results.

Further, it should be pointed out that none of the embodiments as shown provide for reverse drive, and the output shaft always turns in the same direction as the input shaft. In FIGS. 1, 2, 3 and 4 the pinions 38 are driven in one direction by the sun gear 32 and in the reverse direction by the internal gear 36. However, this does not reverse the output shaft. Gears 32 and 36 simply increase or decrease slightly the speed of the output shaft in comparison with the speed of the input shaft.

The same condition exists with the embodiment shown in FIGS. 12 and 13. The pinions 78 may operate in either direction, depending on which of the bevel gears 80 is held stationary, but this also will not reverse the output shaft. It will simply increase or decrease its speed to some extent. When one of the gears 80 is held stationary the opposite gear 80 must turn at double the speed of the input shaft.

Likewise, in FIGS. 16 to 23 no reverse is provided. When one of the bevel gears 106 or 110 is held stationary the bevel pinion 112 rotates in a certain direction and this will increase or decrease by a certain percentage the speed of the output shaft, depending on the helix angle of the worm gears 118. When one of the gears 106 or 110 is held stationary then the opposite gear must rotate at twice the input shaft speed.

The embodiments shown in FIGS. 1 to 7 and 12 to 15 are in static balance and would need no counterweight. The embodiments shown in FIGS. 11 and 16 to 23 are not normally in static balance. Each embodiment has some advantage over the other embodiment which depends to some extent upon the use for which the unit is intended and the ratio of speed change desired.

To avoid spinning the gears 32 or 36 during a sudden start or stop, and thus shifting the phase slightly, the inertia of the gear 32 and its rotating elements should be substantially the same as the inertia of the gear 36 and its rotating elements.

Although the invention has been described with reference to several embodiments thereof, it will be readily apparent to those skilled in the art that various modifications may be made without departing from the inventive concept. It is therefore intended by the appended claims to cover all such modifications which fall within the full scope of the invention.

What is claimed is:

1. A mechanical power transmission comprising a pair of axially aligned rotatable shaft members adapted to be interposed for power transmission between a driving means and a driven means and disposed to provide a straight through direct drive, a gear assembly rotatably mounted on one of said shaft members and fixedly supported to the other of said shaft members for controlling the relative speed of rotation of said shaft members, a worm wheel fixedly attached to said one of said shaft members, said gear assembly including worm gear means in mesh with said worm wheel and disposed for orbital movement therewith about the axis of said shaft members for connecting said shaft members for rotation at the same speed, there being relative motion between the worm wheel and the worm gear only when a speed change is being effected and control means operatively connected to said worm gear means and adapted to be selectively actuated for causing said worm wheel to be driven by said gear means to control the relative speed of rotation of said shaft members.

2. A mechanical power transmission as set forth in claim 1 wherein said worm gear means comprises a pair of self-locking worm gears disposed in constant meshing engagement with said worm wheel, each of said worm gears being supported to said other of said shaft members for rotation therewith and for rotation about its own axis to selectively effect a change in speed of one of said shaft members in response to actuation of said control means.

3. A mechanical power transmission as set forth in claim 2 wherein said control means includes a pair of power transmission gears supported to said other of said shaft members for rotation therewith and forming a divided circuit of power transmission and retarding means connected to each of said power transmission gears and adapted to be actuated for selectively arresting rotation of one of said power transmission gears, and wherein said gear assembly includes at least one driving gear operatively connecting said power transmission gears to said pair of worm gears to thereby control the direction and amount of rotation of said worm gears and the relative speed of rotation of said shaft members in response to actuation of said retarding means.

4. A mechanical power transmission as set forth in claim 3 wherein said pair of power transmission gears comprises an external toothed sun gear and an internal gear coaxially supported to said other of said shaft members, wherein said driving gear operatively connecting said power transmission gears to said pair of worm gears comprises a pinion gear disposed in a planetary manner between said sun gear and said internal gear and a worm gear affixed to a common shaft, said gear assembly further including a pair of worm wheels operatively connecting said last named worm gear to the said pair of worm gears, and wherein said retarding means includes a first brake connected to said sun gear and a second brake connected to said internal gear for selectively arresting the rotation of said sun gear and said internal gear to thereby control the direction and amount of rotation of said pair of worm gears.

5. A mechanical power transmission as set forth in claim 1 wherein said gear assembly comprises a pinion spider and said worm gear means includes a self-locking worm gear carried by said pinion spider and meshing with said worm wheel.

6. A mechanical power transmission comprising a pair of axially aligned driving and driven shaft members, a gear cage rotatably mounted on one of said shaft members and fixedly supported to the other of said shaft members, a worm wheel fixed on the said one of said shaft members, a pair of auxiliary shafts in said gear cage disposed normal with respect to said driving and driven shaft members and journaled at their ends in said gear cage for orbital movement therewith about the axis of said driving and driven shaft members and for rotation with respect thereto about their own axis, a worm gear affixed to each of said auxiliary shafts and meshing with said worm wheel for operating said driving and driven shaft members at a fixed relative speed, and means for controlling the rotation of said auxiliary shaft and said worm gears about the axis of said auxiliary shafts for varying the relative speed between said driving and driven shaft members.

7. A mechanical power transmission as set forth in claim 6 wherein said last named means includes gear means for selectively rotating said auxiliary shafts and said worm gears in one direction for increasing the speed of one of said driving and driven shaft members with respect to the other and in the opposite direction for decreasing the speed of said one of said driving and driven shaft members with respect to the other.

8. A mechanical power transmission as set forth in claim 6 wherein said means for controlling the rotation of said auxiliary shafts and said worm gears includes a pair of power transmission gears coaxially supported to said other of said shaft members and a pinion gear disposed in a planetary manner between said power transmission gears, said pinion gear and power transmission gears being supported for orbital movement with said auxiliary shafts and operatively connected to rotate said auxiliary shafts in response to axial rotation of one or the other of said power transmission gears and means for selectively arresting rotation of one or the other of said power transmission gears for changing the relative speed of said driving and driven shaft members.

9. A mechanical power transmission as set forth in claim 6 wherein said means for controlling the rotation of said auxiliary shafts and said worm gears includes a first sleeve rotatably mounted on said other of said shaft members, a sun gear affixed to said sleeve, a second sleeve rotatably mounted on said first sleeve, an internal gear affixed to said second sleeve in concentric relation with said gun gear, a pinion gear meshing with said sun and internal gears in a planetary manner, gear means operatively connecting said pinion gear to said auxiliary shafts, said pinion gear being supported for orbital movement with said auxiliary shafts and for axial rotation in response to rotation of one of said sleeves relative to the other, and brake means for selectively restraining one or the other of said sleeves against rotation for changing the relative speed of said driving and driven shaft members.

10. A mechanical power transmission as set forth in claim 6 further including indicating means connected to said shaft members for indicating the difference in speed of said driving and said driven shaft members.

11. A mechanical power transmission as set forth in claim 10 wherein said indicating means comprises a stationary internal gear, an inner sun gear coaxial therewith and fixedly attached to said gear cage, an outer sun gear fixedly supported to said one of said shaft members, an outer internal gear rotatably supported to said one of said shaft members, a pinion spider supported to said one of said shaft members, a pair of pinion gears mounted on a common shaft and carried on said spider, said pinion gears being adapted for rotation with said spider and about a common axis, one of said pair of pinions being disposed in mesh with said inner stationary gear and said inner sun gear, the other of said pinions being disposed in mesh with the outer sun gear and the outer internal gear, an indicating arm having a fixed reference point, and means operatively connecting said indicating arm to said outer internal gear for displacing said indicator arm from said reference point in response to a relative change of speed of said shaft members.

12. A mechanical power transmission as set forth in claim 10 wherein said indicating means includes an indicator arm having a fixed reference point, and gear means operatively connecting said indicator arm to said gear cage for displacing said indicator arm from said reference point in response to a relative change of speed of said shaft members.

13. A mechanical power transmission as set forth in claim 6 further including means for supporting said worm gear for end movement parallel to the axis of said auxiliary shaft to provide for even loading of the gear teeth of said worm wheel.

14. A mechanical power transmission as set forth in claim 13 wherein said means for supporting said worm gear for end movement comprises spring washers mounted on and adjacent opposite ends of at least one of said auxiliary shafts.

15. A mechanical power transmission as set forth in claim 6 further including a pinion mounted on each of said auxiliary shafts, at least one of said pinions being adjustable for axial movement on said shaft, said pinions being operatively connected to the controlling means to effect rotation of said auxiliary shafts.

16. A mechanical power transmission comprising a pair of axially aligned rotatable shaft members adapted to be interposed for power transmission between a driving means and a driven means, a gear assembly rotatably mounted on one of said shaft members and fixedly supported to the other of said shaft members for controlling the relative speed of rotation of said shaft members, a worm wheel fixedly attached to said one of said shaft members, said gear assembly including a pinion spider, a self-locking worm gear carried by said pinion spider, said self-locking worm gear being disposed for meshing relationship with said worm wheel and for orbital movement therewith about the axis of said shaft members so as to connect said shaft members for rotation at the same speed, said gear assembly further including a rotatable hypoid pinion carried by said spider and rotatable therewith and disposed for driving said worm gear and a pair of hypoid bevel gears in mesh with said hypoid pinion, said bevel gears being mounted face to face, one on one of said shaft members, the other on said other of said shaft members and control means operatively connected to said worm gear and adapted to be selectively actuated for causing said worm wheel to be driven by said worm gear to control the relative speed of rotation of said shaft members.

17. A mechanical power transmission as set forth in claim 16 wherein said control means includes a first braking means connected to one of the bevel gears and a second braking means connected to the other of the bevel gears for selectively controlling the direction of rotation of said hypoid pinion and said worm gear to thereby change the relative speed of rotation of said shaft members.

18. A mechanical power transmission comprising a straight through direct drive having a through power shaft and a hollow power shaft supported thereto, said shafts being in axial alignment and normally operating at the same speed and in the same direction unless a speed change is being effected, said straight through direct drive being adapted to be interposed for power transmission between a driving means and a driven means, a gear cage mounted to said hollow power shaft, a worm wheel mounted on said through power shaft, a single set of worm gears disposed within said gear cage in intermeshing relationship with said worm wheel and means for selectively increasing or decreasing the relative speed of rotation of said hollow power shaft with respect to said through power shaft.

References Cited

UNITED STATES PATENTS

| | | | |
|---|---|---|---|
| 2,030,027 | 2/1936 | Greenwood | 74—395 |
| 2,030,028 | 2/1936 | Greenwood | 74—395 |
| 1,401,204 | 12/1921 | Storey | 74—710.5 |
| 1,679,610 | 8/1928 | Knox | 74—710.5 |
| 2,940,337 | 6/1960 | Kalb | 74—675 |

DONLEY J. STOCKING, *Primary Examiner.*

L. H. GERIN, *Assistant Examiner.*